US011017977B1

(12) United States Patent
Hunt et al.

(10) Patent No.: US 11,017,977 B1
(45) Date of Patent: May 25, 2021

(54) LIQUID METAL BEARING ASSEMBLY AND METHOD FOR OPERATING SAID LIQUID METAL BEARING ASSEMBLY

(71) Applicant: GE Precision Healthcare LLC, Milwaukee, WI (US)

(72) Inventors: Ian Hunt, Milwaukee, WI (US); Andrew Jay Borland, Whitefish Bay, WI (US); Andrew Triscari, Hubertus, WI (US); Steven Thiel, Colgate, WI (US)

(73) Assignee: GE PRECISION HEALTHCARE LLC, Milwaukee, WI (US)

( * ) Notice: Subject to any disclaimer, the term of this patent is extended or adjusted under 35 U.S.C. 154(b) by 0 days.

(21) Appl. No.: 16/752,533

(22) Filed: Jan. 24, 2020

(51) Int. Cl.
*F16C 17/10* (2006.01)
*H01J 35/10* (2006.01)
*F16C 33/10* (2006.01)

(52) U.S. Cl.
CPC ............ *H01J 35/104* (2019.05); *F16C 17/10* (2013.01); *F16C 33/1085* (2013.01)

(58) Field of Classification Search
CPC .. F16C 17/10; F16C 33/1085; F16C 2380/16; H01J 35/104
See application file for complete search history.

(56) References Cited

U.S. PATENT DOCUMENTS

| | | | |
|---|---|---|---|
| 3,510,179 A | 5/1970 | Larson | |
| 5,298,293 A * | 3/1994 | Ono | F16C 17/107 427/560 |
| 5,487,608 A | 1/1996 | Leuthold et al. | |
| 5,583,907 A * | 12/1996 | Ono | H01J 35/101 378/132 |
| 5,678,929 A | 10/1997 | Parsoneault et al. | |
| 6,477,232 B2 | 11/2002 | Yoshida | |
| 8,363,787 B2 | 1/2013 | Lathrop | |
| 2003/0223661 A1 | 12/2003 | Price et al. | |
| 2011/0058654 A1* | 3/2011 | Tadokoro | H01J 35/104 378/130 |
| 2012/0106712 A1 | 5/2012 | Hunt et al. | |
| 2016/0086760 A1* | 3/2016 | Poquette | H01J 35/101 378/132 |
| 2016/0133431 A1 | 5/2016 | Hunt et al. | |
| 2017/0169984 A1* | 6/2017 | Tiwari | F16C 17/107 |

FOREIGN PATENT DOCUMENTS

DE 19614221 A1 10/1997

OTHER PUBLICATIONS

Lee, Y. et al., "Self-Lubricating and Friction Performance of a Three-Dimensional-Printed Journal Bearing," Journal of Tribiology, vol. 140, No. 5, May 14, 2018, 9 pages.

* cited by examiner

*Primary Examiner* — Phillip A Johnson
(74) *Attorney, Agent, or Firm* — McCoy Russell LLP

(57) ABSTRACT

Liquid metal bearing assemblies and methods for operation of said assemblies are provided. One example liquid metal bearing assembly includes a liquid metal interface positioned between a stationary component and a rotational component. The rotational component includes a liquid metal reservoir configured to contain a liquid metal and positioned radially inward from the liquid metal interface, a liquid metal passage extending between the liquid metal reservoir and the liquid metal interface, and an anti-wetting surface in the liquid metal passage.

20 Claims, 6 Drawing Sheets

US 11,017,977 B1

LIQUID METAL BEARING ASSEMBLY AND METHOD FOR OPERATING SAID LIQUID METAL BEARING ASSEMBLY

TECHNICAL FIELD

Embodiments of the subject matter disclosed herein relate to systems with liquid metal bearing assemblies and methods for operating the liquid metal bearing assemblies.

BACKGROUND

Liquid metal bearings are used in a variety of operating environments due to their increased longevity and ability to more effectively manage thermal loads, relative to roller bearings. Certain x-ray tubes, for example, utilize liquid metal bearings owing at least in part to their durability and thermodynamic characteristics. However, asymmetric liquid metal distribution and gas formation in the bearing's liquid metal interface can occur in the bearing.

SUMMARY

In one embodiment, a liquid metal bearing assembly is provided. The liquid metal bearing assembly includes a liquid metal interface positioned between a stationary component and a rotational component. The rotational component includes a liquid metal reservoir designed to contain a liquid metal and positioned radially inward from the liquid metal interface. The rotational component additionally includes a liquid metal passage extending between the liquid metal reservoir and the liquid metal interface. The rotational component further includes an anti-wetting surface in the liquid metal passage.

The above advantages and other advantages, and features of the present description will be readily apparent from the following Detailed Description when taken alone or in connection with the accompanying drawings. It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present disclosure will be better understood from reading the following description of non-limiting embodiments, with reference to the attached drawings, wherein below.

DETAILED DESCRIPTION

The following description relates to various embodiments of systems (e.g., x-ray systems) and liquid metal bearing assemblies deployed therein. The liquid metal bearings allow a desired level of liquid metal filling precision to be attained in the system. A reduction in gas in the liquid metal and, in some cases, a more even liquid metal distribution in the bearing interface in comparison to other liquid metal bearings may be the outcome of the liquid metal filling precision. Consequently, friction coefficient reductions can be achieved, increasing bearing durability and longevity. The precise filling of the liquid metal bearing is accomplished using a liquid metal reservoir designed to flow the liquid metal into the bearing interface at a targeted location when the bearing reaches a threshold rotational speed. Thus, the liquid metal reservoir functions to precisely fill (e.g., backfill or refill) the bearing interface, when desired, to reduce an amount of gas in the bearing interface and/or provide a more balanced distribution of the liquid metal.

Figure 1:
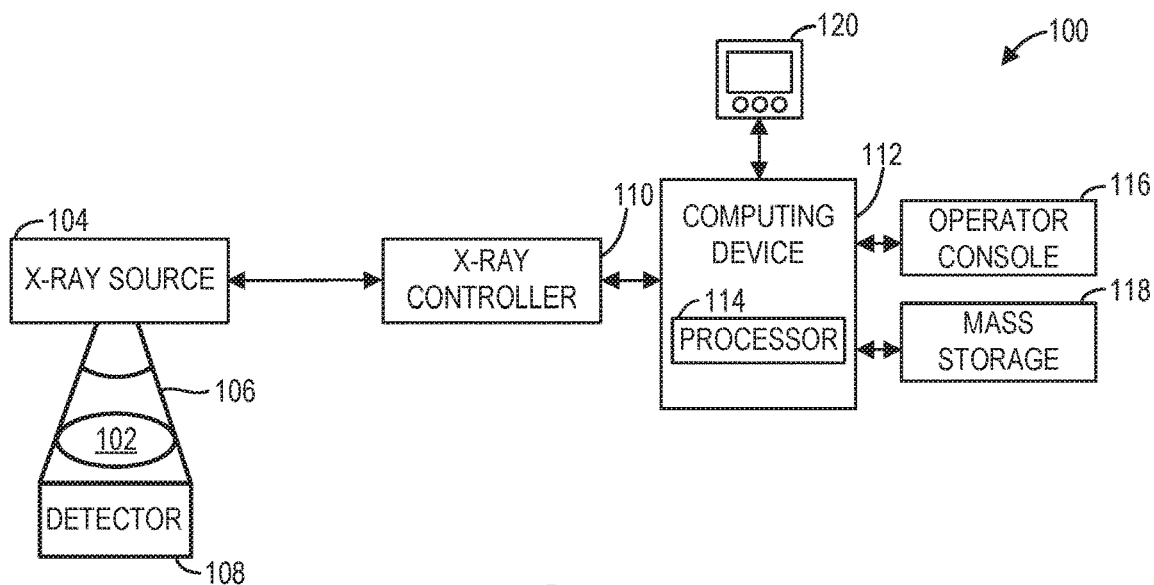
FIG. 1 shows a block schematic diagram of an exemplary x-ray system, according to an embodiment.
Figure 2:
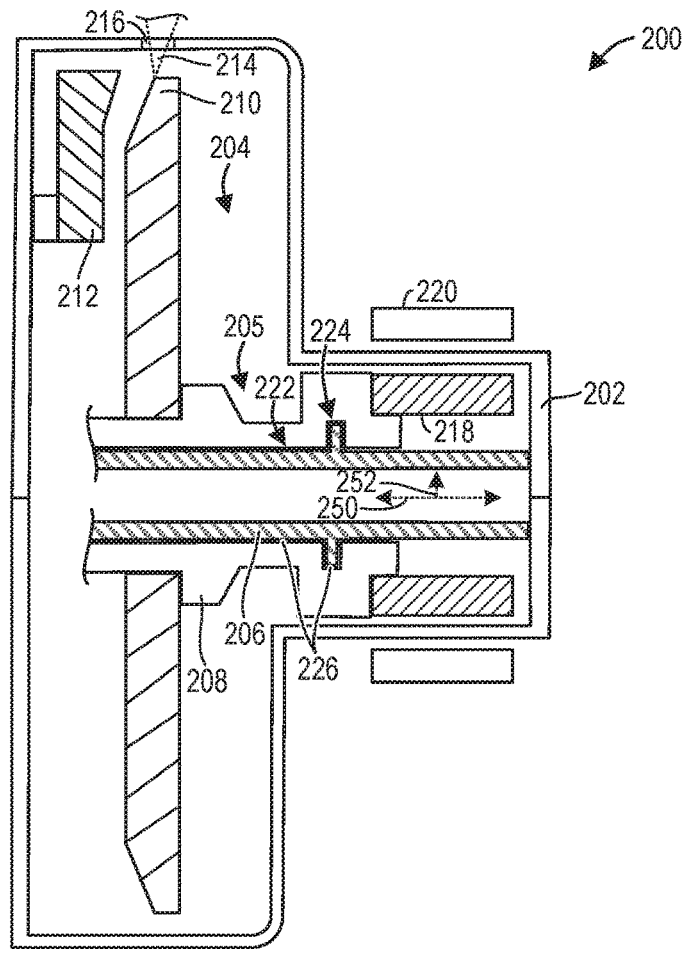
FIG. 2 shows a pictorial view of a portion of an x-ray source, according to an embodiment.
Figure 3:
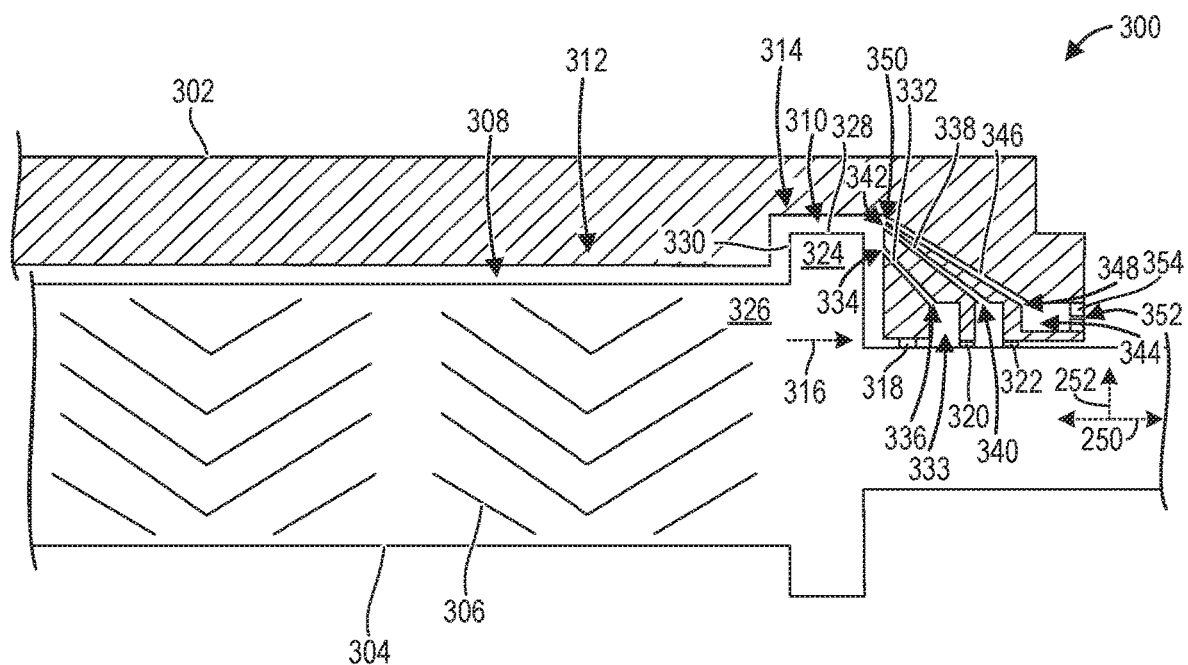
FIG. 3 shows a first exemplary liquid metal bearing assembly, according to an embodiment.
Figure 4:
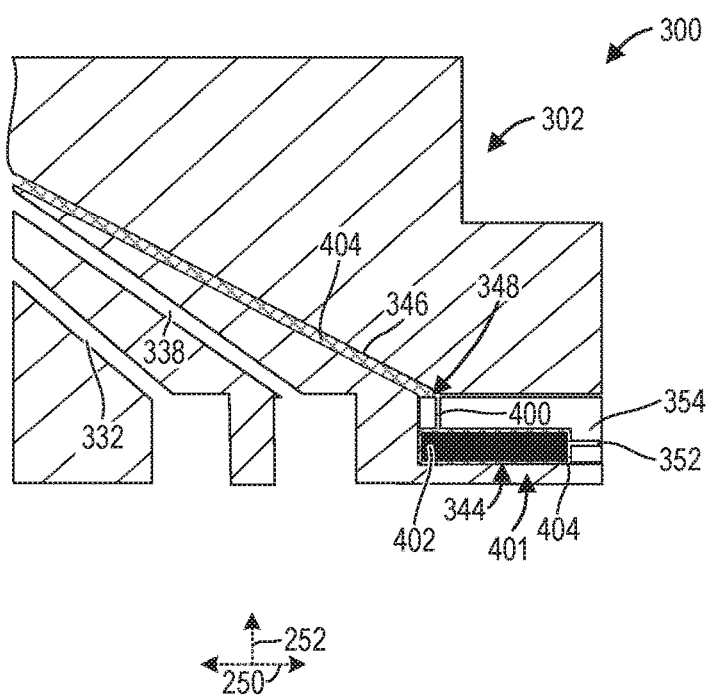
FIG. 4 shows a detailed view of a section of the liquid metal bearing assembly, shown in FIG. 3, including a liquid metal reservoir.
Figure 5:
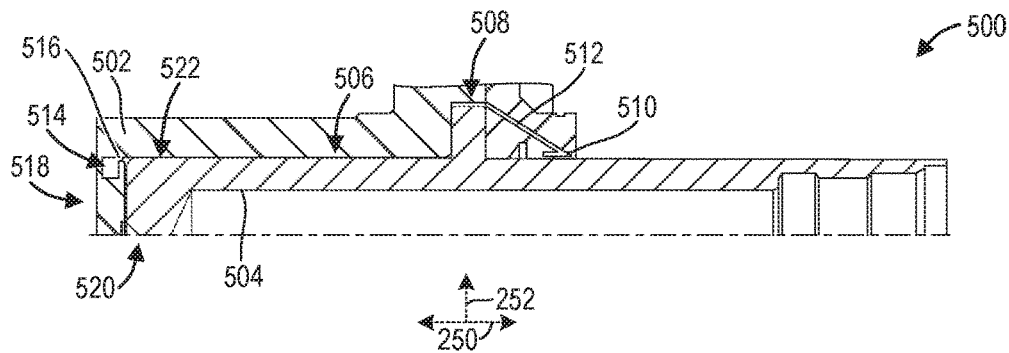
FIG. 5 shows a second exemplary liquid metal bearing assembly with multiple liquid metal reservoirs, according to an embodiment.
Figure 6:
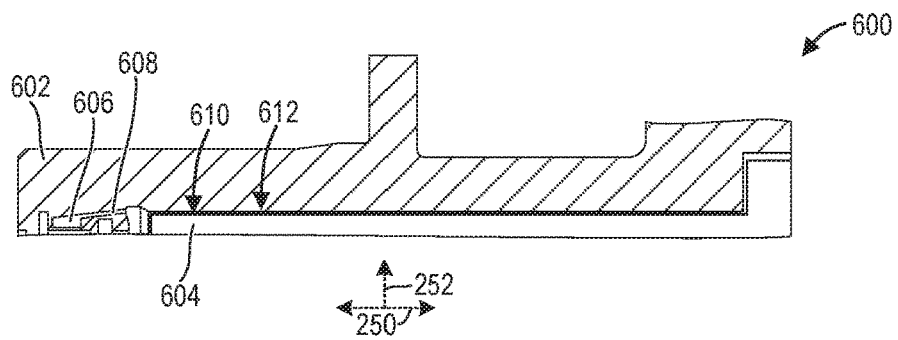
FIG. 6 shows a third exemplary liquid metal bearing assembly having a straddle configuration, according to an embodiment.
Figure 12:
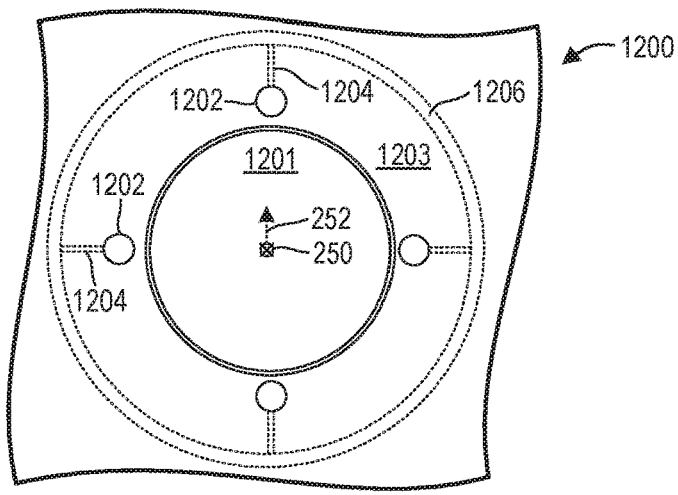
FIG. 12 shows a cross-sectional view of another exemplary liquid metal bearing assembly with a discrete metal reservoir section, according to an embodiment.
Figure 13:
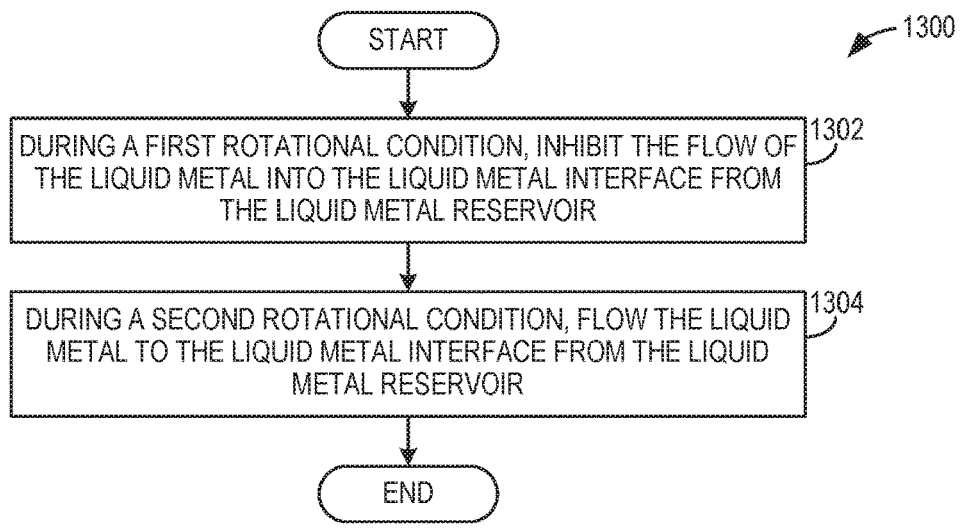
FIG. 13 is an exemplary method for operation of a system including a liquid metal bearing assembly, according to an embodiment.
Figure 14:
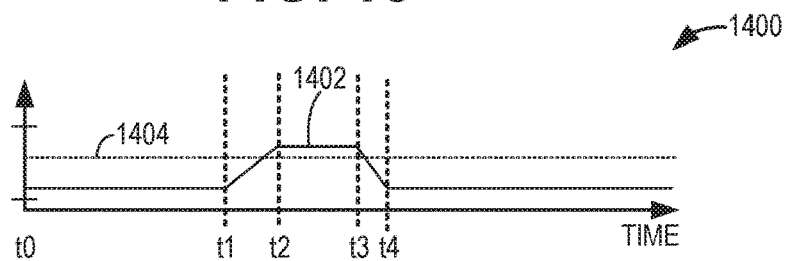
FIG. 14 is a graphical representation of a use-case control strategy for an x-ray system.

An x-ray system including an x-ray source, such as an x-ray tube that functions to generate x-rays, and x-ray controller is shown in FIG. 1. An example of an x-ray system is shown in FIG. 2 with a liquid metal bearing enabling anode rotation. FIG. 3 shows a first embodiment a liquid metal bearing assembly and FIG. 4 illustrates a detailed view of one of the liquid metal bearings with a liquid metal reservoir inboard from the bearing's interface. FIG. 5 shows a detailed view of a second embodiment of a liquid metal bearing assembly having a cantilever design with multiple liquid metal reservoirs. FIG. 6 shows a detailed view of a third embodiment of a liquid metal bearing assembly having a straddle design with multiple liquid metal reservoirs. FIGS. 7-11 show additional embodiments of liquid metal bearing assemblies. FIG. 12 shows a cross-sectional view of a liquid metal bearing assembly with discrete sections of a liquid metal reservoir. FIG. 13 illustrates a method for operation of a system including a liquid metal bearing assembly. FIG. 14 depicts a use-case x-ray system control strategy.

FIG. 1 illustrates an x-ray system 100 designed to generate x-rays. The x-ray system 100 is configured as an imaging system (e.g., computed tomography (CT) system, projection radiography system, fluoroscopy system, tomography system, etc.) in FIG. 1. However, the x-ray system 100 has applicability to fields beyond imaging, medical devices, and the like. For instance, the x-ray system 100 may be deployed in crystallography systems, security scanners, industrial scanners, x-ray photography systems, etc. It will also be appreciated that the liquid metal bearing assemblies described in greater detail herein may be deployed in alternate types of systems utilizing liquid metal bearings, in some instances.

In the imaging system example, the system may be configured to image a subject 102 such as a patient, an inanimate object, one or more manufactured parts, and/or foreign objects such as dental implants, stents, and/or contrast agents present within the body.

The x-ray system 100 may include at least one x-ray source 104, such as an x-ray tube, configured to generate and project a beam of x-ray radiation 106. Specifically, in the illustrated embodiment, the x-ray source 104 is configured to project the x-ray radiation beams 106 towards a detector array 108 and through the subject 102. In some system configurations, the x-ray source 104 may project a cone-shaped x-ray radiation beam which is collimated to lie within an X-Y-Z plane of a Cartesian coordinate system. However, other beam profiles and/or systems omitting the detector array have been envisioned. Each detector element of the array produces a separate electrical signal that is a measurement of the x-ray beam attenuation at the detector location.

Although FIG. 1 depicts only a single x-ray source 104 and detector array 108, in certain embodiments, multiple x-ray sources and/or detectors may be employed to project a plurality of x-ray radiation beams and detect said beams. For instance, in the CT machine use-case example, multiple detectors may be used in tandem with the x-ray sources to acquire projection data at different energy levels corresponding to the subject.

The x-ray system 100 may further include an x-ray controller 110 configured to provide power and timing signals to the x-ray source 104. It will be understood that that system may also include a data acquisition system configured to sample analog data received from the detector elements and convert the analog data to digital signals for subsequent processing.

In certain embodiments, the x-ray system 100 may further include a computing device 112 having a processor 114 and controlling system operations based on operator input. The computing device 112 receives the operator input, for example, including commands and/or scanning parameters via an operator console 116 operatively coupled to the computing device 112. The operator console 116 may include a keyboard, a touchscreen, and/or other suitable input device allowing the operator to specify the commands and/or scanning parameters.

Although FIG. 1 illustrates only one operator console 116, more than one operator console may be included in the x-ray system 100, for example, for inputting or outputting system parameters, requesting examinations, plotting data, and/or viewing images. Further, in certain embodiments, the x-ray system 100 may be coupled to multiple displays, printers, workstations, and/or similar devices located either locally or remotely, for example, and connected via wired and/or wireless networks.

In one example, the computing device 112 stores the data in a storage device or mass storage 118. The storage device 118, for example, may include a hard disk drive, a floppy disk drive, a compact disk-read/write (CD-R/W) drive, a Digital Versatile Disc (DVD) drive, a flash drive, and/or a solid-state storage drive.

Additionally, the computing device 112 provides commands to the x-ray controller 110 and other system components for controlling system operations such as x-ray beam formation, data acquisition and/or processing, etc. Thus, in certain embodiments, the computing device 112 controls system operations based on operator input. To elaborate, the computing device 112 may use the operator-supplied and/or system-defined commands and parameters to operate an x-ray controller 110, which in turn, may control the x-ray source 104. In this way, the intensity and timing of x-ray beam generation may be controlled. It will also be understood that the rotational speed of a sleeve in the x-ray source may be adjusted by the computing device 112 in conjunction with the x-ray controller 110. The rotational speed adjustment of the sleeve may induce the flow of liquid metal into a bearing interface in the x-ray source 104, as described in greater detail herein.

The various methods and processes (such as the method described below with reference to FIG. 13) described further herein may be stored as executable instructions in non-transitory memory on a computing device (or controller) in x-ray system 100. In one embodiment, the x-ray controller may include the executable instructions in non-transitory memory, and may apply the methods described herein to control the x-ray source. In another embodiment, computing device 112 may include the instructions in non-transitory memory, and may relay commands, at least in part, to the x-ray controller which in turn adjusts the x-ray source output.

In one embodiment, a display 120 may also be in electronic communication with the computing device 112 and is configured to display graphical interfaces indicating system parameters, control setting, imaging data, etc.

FIG. 2 shows a detailed embodiment of a portion of an x-ray source, such as an x-ray tube 200. The x-ray source 200 shown in FIG. 2 serves as an example of the x-ray source 104 depicted in FIG. 1. As such, the x-ray source shown in FIG. 2 as well as the other x-ray source embodiments described herein may include functional and/or structural features from the x-ray source 104, shown in FIG. 1, or vice versa. Furthermore, alternate embodiments combining features from one or more of the systems have also been envisioned.

A rotational axis 250 along with a radial axis 252 are provided in FIG. 2 as well as FIGS. 2-12 for reference. It will be understood that a radial axis is any axis perpendicular to the rotational axis 250.

The x-ray source 200 includes a housing 202 having a low-pressure enclosure 204 (e.g., vacuum enclosure) formed therein. It will be understood that a low-pressure enclosure infers a comparatively low-pressure relative to atmospheric pressure. As such, the pressure in the enclosure may be less than atmospheric.

The x-ray source 200 includes a liquid metal bearing assembly 205 with a rotational component 206 (e.g., sleeve) and a stationary component 208 (e.g., shaft). It will be understood that the motion denoted by the descriptors stationary and rotational denote the relative motion between the components. However, in certain use-case examples, the x-ray tube may be integrated into a moving structure. For instance, in the CT imaging system use-case, the x-ray tube may be integrated into a rotating gantry. As such, in smaller scale frame of reference, the shaft is stationary relative to the sleeve but in a larger scale frame of reference, both components exhibit similar rotational motion in the gantry. However, in alternate use-case scenarios, the x-ray tube may be integrated into a stationary structure in regard to the larger scale frame of reference.

The rotational component 206 is a sleeve and the stationary component 208 is a shaft, in the illustrated embodiment. However, embodiment in which the sleeve is stationary and the shaft rotates have been contemplated. An anode 210 is coupled to the stationary component 208. A cathode 212 is also included in the x-ray source 200. The cathode 212 may receive signals from a controller, such as the x-ray controller 110 shown in FIG. 1, to generate an electron beam directed toward a surface of the anode 210. An x-ray beam 214 is generated when the electron beam from the cathode 212 strikes the anode 210. The x-rays are emitted through an x-ray window 216 in the housing 202.

A rotor 218 and a stator 220 are also provided in the x-ray source 200. The rotor 218 is coupled to the rotational component 206 and is designed to impart rotational motion thereto. The stator 220 is shown positioned external to the low-pressure enclosure 204. However, other suitable stator locations have been envisioned. Typically, the rotor and stator can include windings, magnets, electrical connections, etc., electromagnetically interacting to generate rotor rotation responsive receiving control commands, from for example, the x-ray controller 110, shown in FIG. 1.

The liquid metal bearing assembly 205 includes a plurality of liquid metal bearings. Specifically, a liquid metal journal bearing 222 and a liquid metal thrust bearing 224 are included in the assembly. However, assembly configurations with additional or alternate bearings may be used, in other embodiments. The liquid metal journal bearing 222 is designed to support radial loads and the liquid metal thrust bearing 224 is designed to support axial loads. In this way, loads on the sleeve are managed to enable efficient sleeve rotation.

Each of the bearings include an interface 226 in which liquid metal acts as a lubricant and also supports loads. The thickness of the interface may be selected based on factors such as the type liquid metal used in the bearing, manufacturing tolerances of the components, expected system operating temperature, etc. Thus, in one use-case example the liquid metal interface may be on the order of 5 microns (μm)-40 μm. The liquid metal used as the working fluid in the bearing assembly may include gallium, tin, indium, combinations thereof, etc.

The rotational component 206 (e.g., sleeve) includes structures designed to flow liquid metal into the interface 226 during selected operating conditions, resulting in a reduction in gas formation in the interface and/or a more even liquid metal distribution across the bearing assembly. In certain embodiments, supplying additional liquid metal to the interface may also decrease the likelihood of overfilling of the bearing when compared to manufacturing techniques introducing a relatively large amount of liquid metal into the bearing's interface earlier in the manufacturing sequence, for instance. To elaborate, the liquid metal from a reservoir may be introduced into the bearing interface after a vacuum is generated in the system's enclosure. Various embodiments of the assembly structures designed to selectively flow liquid metal into the bearing interface are described in greater detail herein with regard to FIGS. 3-12.

FIG. 3 specifically depicts an embodiment of a liquid metal bearing assembly 300. The liquid metal bearing assembly 300 is an example of the liquid metal bearing assembly 205, depicted in FIG. 2. As such, features from the bearing assembly 205 and more generally, the x-ray source 200 may be included in the liquid metal bearing assembly 300 as well as the other liquid metal bearing assembly embodiments described herein.

The liquid metal bearing assembly 300 again includes a rotational component 302 and a stationary component 304. The rotational component 302 is shown with herringbone grooves 306. The stationary component 304 may correspondingly include spiral grooves. These grooves may work in conjunction to generate pressure in the liquid metal to support the bearing load. It will therefore be understood that the bearings described herein may be self-acting bearings designed to generate pressure using the surface geometries at the bearing interface. However, bearing embodiments including alternate groove patterns or embodiments omitting of at least a portion of the grooves to alter the bearing's flow dynamics, have been contemplated.

Liquid metal interfaces 308 and 310 are provided at a liquid metal journal bearing 312 and a liquid metal thrust bearing 314, respectively. In the illustrated example, the two bearings have a continuous layer of liquid metal extending therewithin and therebetween. However, arrangement with discrete sections of liquid metal have been contemplated.

The liquid metal bearing assembly 300 further includes seals designed to reduce the amount of liquid metal leaking from the bearings. The seals may be rotating labyrinth seals providing a circuitous path impeding liquid metal flow in an axial direction 316 away from an anode, such as the anode 210, shown in FIG. 2. However, additional or alternate types of suitable seals or combinations of seals have been contemplated such as capillary seals, hydrodynamic seals, flange seals, foil seals, etc. A first seal 318, a second seal 320, and a third seal 322 are shown in the illustrated embodiment and sequentially arranged axially along the assembly. However, an alternate number of seals and/or seal arrangement may be used, in other configurations.

The liquid metal thrust bearing 314 includes a flange 324 extending from a body 326 of the stationary component 304 toward a complimentary section of the rotational component 302 (e.g., sleeve) with a volume of liquid metal therebetween. To elaborate, the flange 324 includes a distal surface 328 at a radial end and two axial sides 330. Thus, the flange 324 radially extends from the body 326 of the stationary component 208 (e.g., shaft) forming an annular shape. However, other flange contours have been envisioned. The flange 324 serves to support axial loads, increasing the assembly's load bearing capacity.

Furthermore, the seals (the first seal 318, second seal 320, and third seal 322) in the assembly are designed to reduce liquid metal leaks from bearing assembly. However, in practice liquid metal may travel in an axial direction away from the anode past the liquid metal thrust bearing 314 and through one or more of the seals. Thus, liquid metal may travel past the first seal 318, under certain conditions. A metal flowback passage 332 may also be provided with an inlet manifold 333 between the first and second seals 318 and 320, respectively, in the rotational component 302 to flow the leaked fluid back to liquid metal interface at the distal surface 328 of the flange 324.

The metal flowback passage 332 includes a first opening 334, functioning as an inlet, radially inboard from the interface 310 and a second opening 336, functioning as an outlet, adjacent to the interface 310. It will also be understood that the metal flowback action occurs when the rotational component 302 rotates above a threshold speed to generate centrifugal forces acting on the liquid metal to induce backflow. It will also be appreciated that the flowback passage 332 may be designed to flow metal back to the bearing interface at a relatively low angular speed, enabling the flowback passage to operate over a wider range of operating conditions. The width of the flowback passage 332, surface properties of the passage, the angle of the passage, and/or the length of the passage may be tuned to achieve desired liquid metal flowback dynamics. Furthermore, in one example, the angular speed at which liquid metal flow through the flowback passage 332 is induced may be lower than an angular speed at which liquid metal flow through a liquid metal passage 346 is induced. However, in other examples, the flowback passage 332 may be omitted from the assembly to reduce manufacturing costs, for instance.

A gas vent conduit 338 may additionally be provided in the rotational component 302. The gas vent conduit 338 is arranged between the second seal 320 and the third seal 322, in the illustrated embodiment. However, other passage positions may be used, in other embodiments. The gas vent conduit 338 includes a first opening 340 axially positioned between the second and third seals 320 and 322, respectively and a second opening 342 adjacent to the interface 310. The gas vent conduit 338 allows gas to flow out of the interface 310 while the liquid metal bearing assembly is initially being filled with liquid metal during manufacturing. It will be appreciated that the gas vent conduit may have a smaller diameter than the flowback passage 332, to reduce the likelihood of liquid metal flowing therethrough, in certain embodiments.

The liquid metal bearing assembly 300 additionally includes a liquid metal reservoir 344 and the liquid metal passage 346 extending therefrom. The liquid metal reservoir may have an annular shape, in one example. However, other suitable reservoir shapes may be used in other examples, expanded upon in greater detail herein with regard to FIG. 12. Continuing with FIG. 3, the liquid metal passage 346 includes a first port 348 opening into the liquid metal reservoir 344 and a second port 350 opening into the liquid metal interface 310 adjacent to the distal surface 328 of the flange 324. Thus, the liquid metal reservoir 344 is positioned axially inboard from the interface 310, enabling centrifugal forces to cause liquid metal flow into the liquid metal passage 346 when the rotational component's angular speed is above a threshold value (e.g., 60 Hz-180 Hz). To elaborate, the outer diameter of the liquid metal reservoir 344 is less than the inner diameter of the bearing interface 310 to allow centrifugal forces to act on the liquid metal and induce liquid metal flow. Therefore, the interface 310 is positioned outboard of the liquid metal reservoir 344. The second port 350 is shown including an outer radius and an inner radius positioned radially outward from the distal surface 328. However, different arrangements of the second port have been contemplated. For instance, in another example, the outer radius of the second port 350 may be positioned outboard from the distal surface 328 but the inner radius of the second port 350 may be positioned inboard from the distal surface to form a more compact liquid metal routing arrangement. It will also be appreciated that the arrangement of the first port 348 and the second port 350 in the liquid metal passage 346 allows the liquid metal to bypass the seals 318, 320, 322 in the assembly. In this way, the liquid metal passage 346 may axially bridge the seals.

Once liquid metal flows into the liquid metal passage 346, centrifugal forces along with capillary action induce liquid metal flow down the passage towards the second port 350, when the rotational component's angular speed exceeds the threshold value. It will be appreciated, that the passage's width as well as coating, described in greater detail herein, may be designed to achieve targeted capillary action. As such, the width of the liquid metal passage, the length of the liquid metal passage, the angle of the liquid metal passage, and/or the coating of the liquid metal passage may be tuned to achieve a target rotational threshold at which liquid metal flows from the liquid metal reservoir 344 to the liquid metal passage 346 and then to the interface 310 from the liquid metal passage. Conversely, when the rotational component's angular speed is less than the threshold value, liquid metal flow from the liquid metal reservoir 344 to the liquid metal passage 346 and/or liquid metal flow from the liquid metal passage into the interface 310 is inhibited. The inhibition of flow, during these conditions, is due to the wetting characteristics of the liquid metal reservoir 344 and the liquid metal passage 346 as well as the geometric characteristics of the liquid metal reservoir and the liquid metal passage. In this way, the liquid metal in the reservoir 344 may be contained therein until metal filling of the bearing interface 310 is desired. As such, the rotational component 302 may be kept below the threshold speed until filling is wanted. Consequently, the metal filling process for the liquid metal bearing assembly 205 may be adapted to allow the bearing to provide a desired amount of liquid metal filling with a reduced amount of gas formation in the liquid metal. Furthermore, the metal filling process may also be tailored to reduce the likelihood of overfilling of the bearing assembly, in some cases.

Anti-wetting surfaces may also be included in the liquid metal reservoir 344 and/or the liquid metal passage 346. The anti-wetting features are described in greater detail herein with regard to FIG. 4.

The liquid metal passage 346, vent conduit 338, and flowback passage 332 are illustrated as discrete conduits traversing the rotational component. However, in other examples, one or more of the aforementioned passages may merge to form a common manifold next to the interface. For instance, the openings may merge to form a manifold circumferentially extending around the rotational component 302.

The liquid metal reservoir 344 may also include a gas vent passage 352. The gas vent passage 352, in some embodiments, may extend through a welded and/or press fit plug 354 into an opening in the reservoir. The gas vent passage 352 is shown extending in an axial direction. However, in other embodiments, the gas vent passage 352 may be angled with regard to the rotational axis 250. The gas vent passage may be designed to allow gas to flow from the reservoir when it is filled with metal but substantially prevent liquid metal flow therethrough.

A detailed view of a section of the liquid metal bearing assembly 300 revealing additional details of the liquid metal reservoir 344, is depicted in FIG. 4. The vent conduit 338 and flowback passage 332 are also depicted in FIG. 4.

The liquid metal reservoir 344 is depicted axially extending through the rotational component 302 and is bounded on an interior radial side via a wall 401 to inhibit the flow of metal in a radial inward direction. In this way, the liquid metal may be retained in the rotational component 302, when for example, the rotational component is at rest. However, alternate contours of the liquid metal reservoir 344 may be used, in other examples.

The liquid metal reservoir 344 includes the plug 354 with the gas vent passage 352, in the illustrated example. Specifically, in the example shown in FIG. 4, the plug 354 includes a liquid metal conduit 400 extending between the portion of the reservoir 344 containing a liquid metal 402 and the first port 348 of the liquid metal passage 346. The liquid metal conduit 400 is sized to substantially prevent liquid metal flow into the liquid metal passage 346 when the rotational component 302 is rotating at a speed below the previously mentioned threshold. The gas vent passage 352 may have a smaller cross-sectional area (e.g., diameter) than the liquid metal conduit 400, in certain embodiments, to provide desired gas and liquid metal flow dynamics. In other examples, the section of the plug 354 including the liquid metal conduit 400 may be forgone.

Anti-wetting surfaces 404 are shown included in the liquid metal reservoir 344 and the liquid metal passage 346. However, in certain examples, the anti-wetting surfaces 404 may be included in the liquid metal reservoir 344 or the liquid metal passage 346. The anti-wetting surfaces 404 allow the flow properties in the corresponding component to be modified to allow, in part, a desired rotational threshold speed at which liquid metal flows from the liquid metal reservoir 344, through the liquid metal passage 346, and then into the interface 310, shown in FIG. 3, to be achieved. To elaborate, the anti-wetting surfaces 404, shown in FIG. 4 may be a layer of material and/or other suitable surface treatment designed to reduce the ability of the liquid metal to maintain contact with the surface. Anti-wetting coatings may include ceramics such as titanium oxides, aluminum oxide, titanium nitride, carbides; and oxides, such as native oxides and applied or enhanced oxide coatings; or, any other such coating known in the art.

FIG. 5 shows another embodiment of a liquid metal bearing assembly 500. The liquid metal bearing assembly 500 again includes a rotational component 502, a stationary component 504, a liquid metal journal bearing 506, and a liquid metal thrust bearing 508. The liquid metal bearing assembly 500 also includes a first liquid metal reservoir 510, first liquid metal passage 512, second liquid metal reservoir 514, and second liquid metal passage 516. The first liquid metal reservoir 510 and the first liquid metal passage 512 are relatively similar in form and function to the liquid metal reservoir 344 and liquid metal passage 346, shown in FIGS. 3 and 4. As such, redundant description is omitted for brevity.

The liquid metal bearing assembly 500 has a cantilever design where the stationary component 504 is fixed at one axial end and unsupported at the other axial end. The cantilever design may be less costly to manufacture than other designs, such as a straddle design, for instance. As shown, a section 518 of the rotational component 502 radially extends across the unsupported end 520 of the stationary component 504. The second liquid metal reservoir 514 and a second liquid metal passage 516 reside in the section 518 of the stationary component 504. Again, the second liquid metal reservoir 514 is positioned radially inward from an interface 522 of the journal bearing 506, allowing liquid metal to flow from the reservoir to the interface when the rotational component's rotational speed surpasses a threshold value. The profile of the liquid metal reservoir as well as the properties of an anti-wetting surface in the liquid metal passage and/or liquid metal reservoir may dictate the magnitude of the threshold, as previously discussed.

The first liquid metal reservoir 510 and/or the second liquid metal reservoir 514 may also include gas vents, to allow for gas venting during reservoir fill. Providing multiple metal reservoirs in the system allows for more granular filling of the bearing assembly. Consequently, the system can achieve further reductions in gas in the liquid metal interface and undesirable liquid metal distribution.

FIG. 6 shows yet another embodiment of a liquid metal bearing assembly 600 with a rotational component 602 and a stationary component 604. The liquid metal bearing assembly 600 shown in FIG. 6 has a straddle configuration where the stationary component is fixedly supported at both axial ends. Structurally supporting the shaft in this manner, may decrease shaft flexion, when compared to the cantilever design.

A liquid metal reservoir 606 along with a liquid metal passage 608 are again illustrated and configured to flow liquid metal into an interface 610 of the liquid metal journal bearing 612 during selected conditions. The liquid metal reservoir 606 is again positioned radial inboard from the bearing interface 610, allowing liquid metal flow from the reservoir to the interface when the threshold rotational speed of the rotational component 602 is exceeded. The liquid metal reservoir 606 may again include a gas vent. Moreover, the liquid metal reservoir 606 and/or the liquid metal passage 608 may include anti-wetting surfaces.

Figure 7:
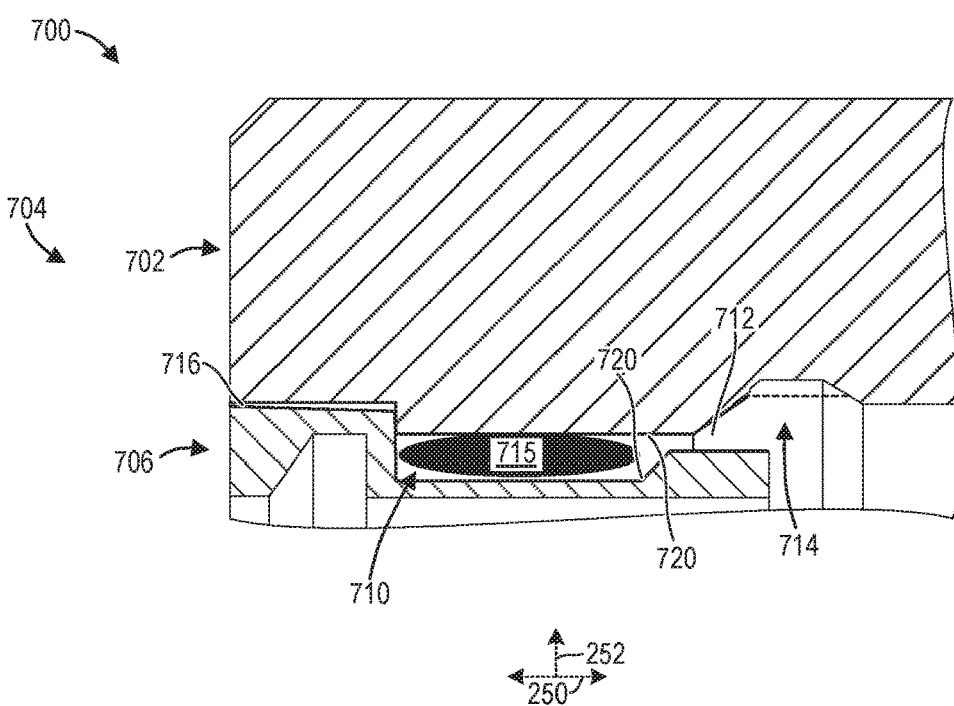
FIGS. 7-11 show additional exemplary liquid metal bearing assemblies where sections of the rotational components are interference fit to form liquid metal reservoirs, according to different embodiments.

FIGS. 7-11 show further embodiments liquid metal bearing assemblies with detailed views of the rotational components and corresponding liquid metal reservoirs. Turing to FIG. 7, a liquid metal bearing assembly 700 is depicted in which a first section 702 of a rotational component 704 is press fit and/or welded to a second section 706 of the rotational component. It will be appreciated that an interference fit interface may be formed between the two sections of the rotational component subsequent to the press-fitting step. Likewise, a welded segment may be the byproduct of welding two components to one another. A liquid metal reservoir 710 and a liquid metal passage 712 are formed between the first section 702 and the second section 706. The liquid metal passage 712 again extends to a bearing interface 714. A liquid metal 715 contained in the reservoir is also illustrated in FIG. 7. However, it will be understood that once the rotational component is rotated above a threshold speed the liquid metal evacuates from the reservoir.

A gas vent passage may be formed at the surface 716 via one or more microchannels in the surface. The microchannels may be constructed via machining, etching, etc., to efficiently construct gas vents for the liquid metal reservoir. Furthermore, manufacturing the microchannels may be less costly and less intrusive with regard to material deformation of the rotational component when compared to other manufacturing techniques, in some instances.

In one use-case example, the volume of the liquid metal reservoir 710 may be in a range of 0.5 cubic centimeters ($cm^3$) to 1.5 $cm^3$. Further, in another use-case example, the width of the liquid metal passage 712 in the range of 10 µm to 40 µm. However, other sizes of the liquid metal reservoir and/or liquid metal passage have been envisioned. The size of the liquid metal reservoir may be selected based a variety of factors such as the type of metal using the assembly, the thickness of the liquid metal interface, the number of bearings in the assembly, etc. Furthermore, the size of the liquid metal passage may be selected based on factors such as the material properties of the type of liquid metal used in the assembly, vacuum pressure in the assembly, expected temperature of the assembly, etc.

The surfaces 720 forming the boundary of the liquid metal reservoir 710 and/or the liquid metal passage 712 may have a layer of ceramic thereon, in some instances Ceramic coatings offer a relatively high resistance to gallium corrosion at high temperatures during processing and use and retain their anti-wetting properties. Such coatings may be replaced with cheaper alternatives, like native oxides, to reduce costs so long as the use and processing temperatures remain low enough to maintain their anti-wetting properties or the design foregoes the use of anti-wetting properties in the liquid metal reservoir and/or liquid metal passage.

Figure 8:
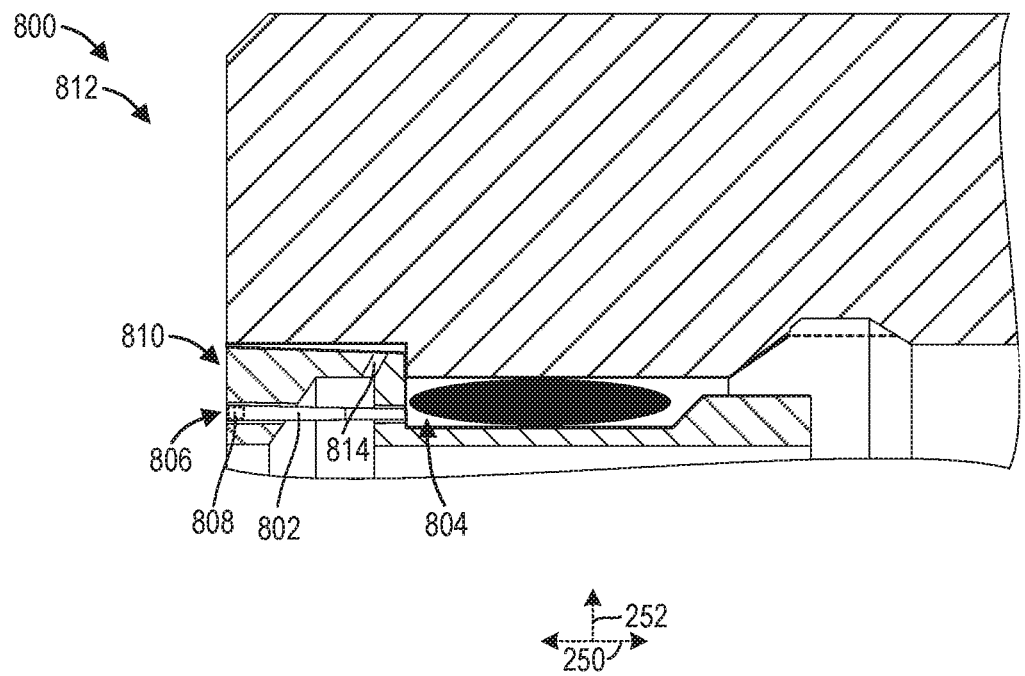

FIG. 8 shows another example of a liquid metal bearing assembly 800 similar to the liquid metal bearing assembly 700, shown in FIG. 7. As such redundant description is omitted for brevity. However, the liquid metal bearing assembly 800 shown in FIG. 8 includes a fill port 802 allowing for filling of a liquid metal reservoir 804. For instance, a syringe with liquid metal may be inserted through the fill port 802 to facilitate precise and efficient reservoir filling. In such an example, the fill port may be welded or otherwise plugged at the end 806 subsequent to filling of the liquid metal reservoir 804. Thus, in such an example a plug 808 may be formed at the end 806 of the fill port 802.

The fill port 802 may be a hollow rod coupled to the section 810 of the rotational component 812 via a suitable attachment technique such as tapered press fitting, welding, and the like. FIG. 8 also shows a vent hole 814 in the section 810. The vent hole 814 allows for gas and/or metal to vent from the press-fit interface during assembly. However, in other examples, the vent hole 814 may be omitted from the bearing assembly.

Figure 9:
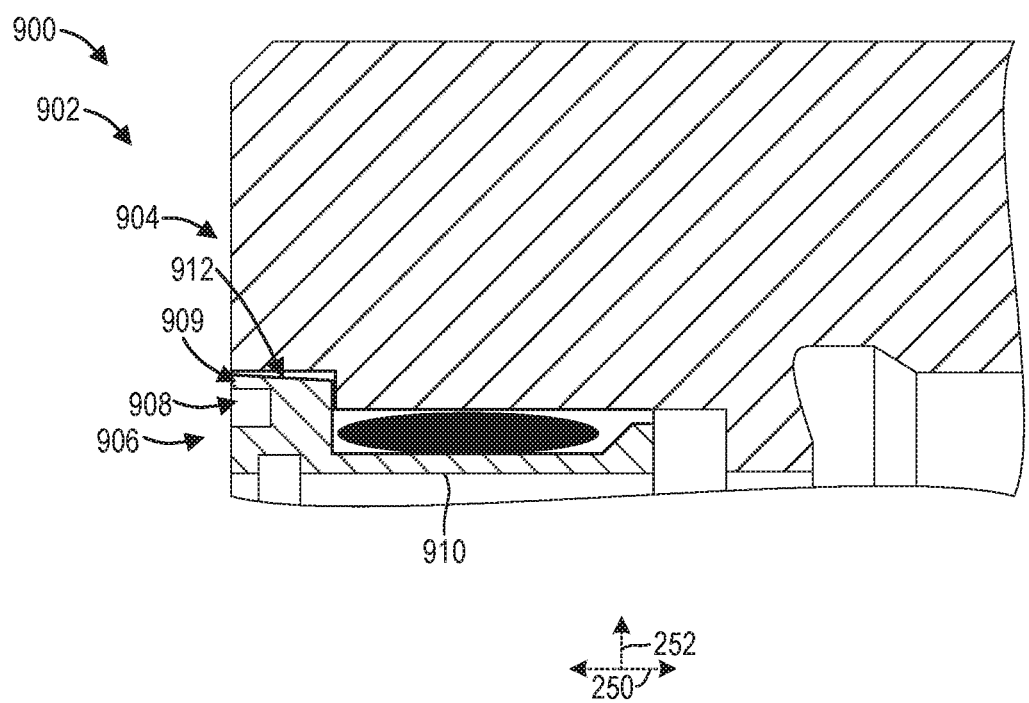

FIG. 9 shows a liquid metal bearing assembly 900. The liquid metal bearing assembly 900 again includes rotational component 902 with a first section 904 press fit (e.g., tapered press fit) and/or welded to a second section 906.

A stress relief portion 908 may be provided in the second section 906 to accommodate for material deformation occurring when the sections are coupled (e.g., press-fit) to one another, to reduce the chance of the surface 910 deforming in an unwanted manner Thus, the flange 909 may deflect in a controlled manner when the sections are attached (e.g., press-fit) to one another. In this way, the chance of friction developing from distorted surfaces during bearing rotation may be reduced. In other words, using the press fit (e.g., tapered press fit) attachment technique with the stress relief portion 908 allows the sections of the rotational component to be efficiently coupled while reducing the chance of unwanted deformation of the bearing surfaces. However, other suitable fill port manufacturing techniques may be used, in other examples.

The surface 912 in the second section 906 may also be angled (e.g., an angle between 5° and 15°) with regard to the rotational axis 250, in some examples, to further decrease the chance of unwanted component deformation.

Figure 10:
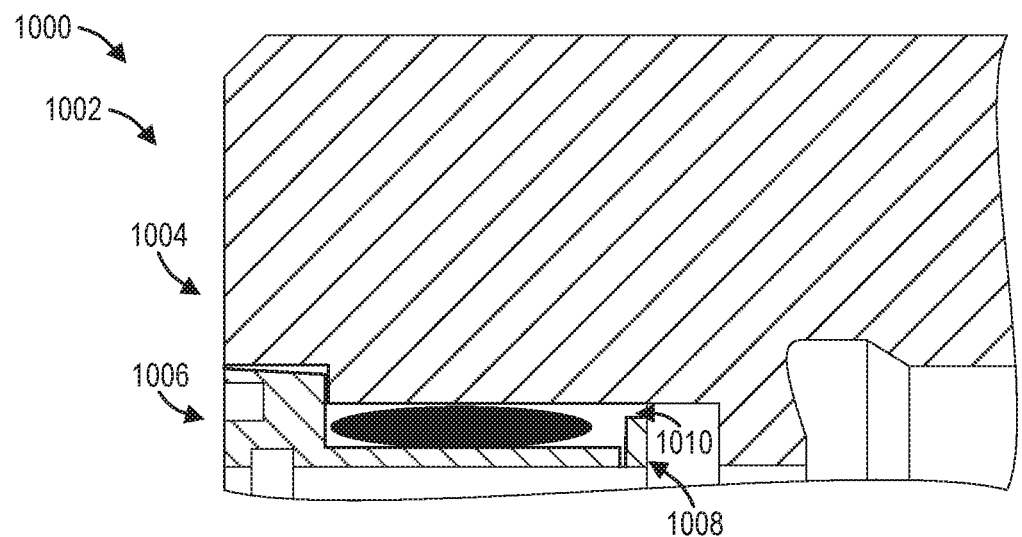

FIG. 10 shows yet another liquid metal bearing assembly 1000. The liquid metal bearing assembly 1000 includes a rotational component 1002 with a first section 1004, a second section 1006, and a third section 1008. The third section 1008 may be coupled (e.g., press-fit, welded, combinations thereof, etc.) to the first section 1004 to allow a size of the liquid metal passage 1010 to be precisely formed. The third section 1008 may be dimpled to allow the piece to be more efficiently and precisely coupled to the first section 1004. By using a third press-fit section, the chance of unwanted deformation of the bearing interface in the sleeve is further reduced.

Additionally, as illustrated in FIG. 10, the liquid metal passage 1010 has a stepped profile in FIG. 10 which may simplify construction of the rotational component. However, other suitable liquid metal passage profiles, such as curved profiles, angled profiles, etc., may be used, in other embodiments.

Figure 11:
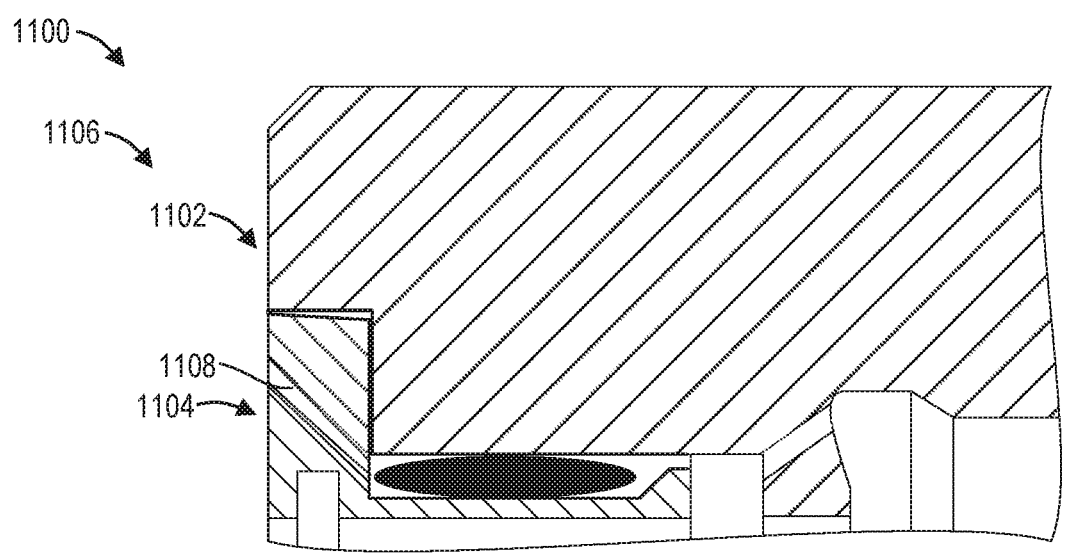

FIG. 11 shows yet another liquid metal bearing assembly 1100. The liquid metal bearing assembly 1100 again includes a first section 1102 and a second section 1104 of a rotational component 1106. However, as shown in FIG. 11, a fill port 1108 included in the second section 1104 is angled with regard to the rotational axis 250. Angling the fill port may allow the fill port to be more easily accessed for filling, in certain embodiments.

FIG. 12 shows a cross-sectional view of yet another liquid metal bearing assembly 1200 including a stationary component 1201 and a rotational component 1203. The liquid metal bearing assembly 1200 includes discrete liquid metal reservoir sections 1202 and corresponding liquid metal passages 1204. The liquid metal passages extend from the reservoir sections to a liquid metal interface 1206 in the assembly. In this way, the liquid metal filling may be carried out in a more granular manner. However, in other embodiments, the liquid metal reservoirs described herein may form continuous enclosures at least partially circumferentially extending around the rotational components. Thus, in such an example, the liquid metal reservoir may form an annular shape. In either example, liquid metal distribution with regard to the reservoir may be designed to reduce rotational imbalances in the assembly. As such, in the annular reservoir embodiment, the cross-sectional area of the reservoir may be substantially constant, around its circumference, to reduce the likelihood of uneven liquid metal distribution, in one example. Conversely, in the embodiment with discrete reservoir sections, shown in FIG. 12, the discrete reservoir sections may be symmetrically arranged about the rotational axis 250 of the assembly, to reduce the chance of asymmetric liquid metal distribution, in some embodiments.

FIG. 13 shows a method 1300 for operation of a liquid metal bearing assembly. The method 1300 as well as the other control strategies described herein may be implemented by any of the systems, assemblies, components, devices, etc., described above with regard to FIGS. 1-12. However, in other examples, the method 1300 may be carried out by other suitable systems, assemblies, components, devices, etc. Instructions for carrying out method 1300 and/or the other control strategies described herein may be at least partially executed by a processor based on instructions stored in memory (e.g., non-transitory memory).

At 1302, the method includes during a first rotational condition, inhibiting the flow of the liquid metal into the liquid metal interface from the liquid metal reservoir. Next at 1304, the method includes during a second rotational condition, flowing the liquid metal to the liquid metal interface from the liquid metal reservoir. The first rotational condition may be a condition where the rotational component's angular speed is less than a threshold value and the second rotational condition may be a condition where the rotational component's angular speed is greater than the threshold value. In one example, the method may further include, prior to step 1302, filling the liquid metal reservoir with liquid metal and venting gas from the liquid metal reservoir through a gas vent passage. In this way, the reservoir can be filled with a desired amount of liquid metal.

Method 1300 allows the bearing assembly to be filled at targeted times by controlling the speed of the rotational component (e.g., the sleeve coupled to the anode). Consequently, a precise amount of liquid metal can be introduced into the bearing's interface at a desired time to reduce gas in the interface and provide a more balanced liquid metal distribution in the bearing.

FIG. 14 shows a graphical embodiment 1400 of a use-case x-ray system control technique. Time is indicated on the abscissa of the graph and rotational speed is indicated on the ordinate. Although specific numerical values are not indicated on the abscissa, it will be understood that the relative timing of different steps, events, etc., may be ascertained from the graphs.

Plot 1402 indicates a rotational speed of the rotational component (e.g., a sleeve connected to the anode) in the liquid metal bearing assembly. A threshold rotational speed 1404 at which liquid metal flows from the reservoir to the bearing interface. As previously discussed, several design factors may be adjusted to achieve a desired threshold speed at which liquid metal flow is induced. Such factors may include: the size and profile of the liquid metal reservoir and/or flow passage; anti-wetting surface characteristics; and/or material properties of the liquid metal itself.

From t0 to t1, the sleeve is kept below the threshold speed. The rotational speed is increased from t1 to t2, surpassing the threshold and generating liquid metal flow from the reservoir into the bearing's liquid metal interface. The rotational speed of the sleeve is maintained from t2 to t3 to allow a controlled amount of liquid metal to flow into the bearing interface. Subsequently, from t3 to t4 the rotational speed of the sleeve is decreased, once desired bearing interface filling is achieved.

A technical effect of using a liquid metal reservoir in a liquid metal bearing is to allow a precise amount of liquid metal to be delivered to the bearing interface as well as reduce an amount of gas in the bearing interface.

In another representation, an x-ray tube is provided which includes an anode rotationally coupled to a sleeve interfacing with a fixed shaft in a vacuum. The sleeve includes a metal reservoir designed to flow liquid metal into a location between the sleeve and the fixed shaft to reduce gas in the interface.

When introducing elements of various embodiments of the present disclosure, the articles "a," "an," and "the" are intended to mean that there are one or more of the elements. The terms "first," "second," and the like, do not denote any order, quantity, or importance, but rather are used to distinguish one element from another. The terms "comprising," "including," and "having" are intended to be inclusive and mean that there may be additional elements other than the listed elements. As the terms "connected to," "coupled to," etc. are used herein, one object (e.g., a material, element, structure, member, etc.) can be connected to or coupled to another object regardless of whether the one object is directly connected or coupled to the other object or whether there are one or more intervening objects between the one object and the other object. In addition, it should be understood that references to "one embodiment" or "an embodiment" of the present disclosure are not intended to be interpreted as excluding the existence of additional embodiments that also incorporate the recited features. As described herein "approximately" and "substantially" refer to values of within plus or minus five percent, unless otherwise noted.

In addition to any previously indicated modification, numerous other variations and alternative arrangements may be devised by those skilled in the art without departing from the spirit and scope of this description, and appended claims are intended to cover such modifications and arrangements. Thus, while the information has been described above with particularity and detail in connection with what is presently deemed to be the most practical and preferred aspects, it will be apparent to those of ordinary skill in the art that numerous modifications, including, but not limited to, form, function, manner of operation and use may be made without departing from the principles and concepts set forth herein. Also, as used herein, the examples and embodiments, in all respects, are meant to be illustrative only and should not be construed to be limiting in any manner.

The invention claimed is:

1. A liquid metal bearing assembly comprising:
   a liquid metal interface positioned between a stationary component and a rotational component;
   where the rotational component comprises:
      a liquid metal reservoir configured to contain a liquid metal and positioned radially inward from the liquid metal interface;
      a liquid metal passage extending between the liquid metal reservoir and the liquid metal interface; and
      an anti-wetting surface in the liquid metal passage.

2. The liquid metal bearing assembly of claim 1, a gas vent passage in fluidic communication with the liquid metal reservoir and configured to vent gas from the liquid metal reservoir.

3. The liquid metal bearing assembly of claim 2, a first section of the rotational component forms an interference fit with a second section of the rotational component and where the liquid metal reservoir, the gas vent passage, and/or the liquid metal passage are formed in an interface between the first and second sections.

4. The liquid metal bearing assembly of claim 2, where the gas vent passage includes one or more microchannels in an outer surface.

5. The liquid metal bearing assembly of claim 4, where the one or more microchannels constructed via machining and/or etching.

6. The liquid metal bearing assembly of claim 1, where the anti-wetting surface and the liquid metal passage are configured to:
   when an angular speed of the rotational component is less than a threshold value, inhibit a flow of the liquid metal into the liquid metal interface; and
   when the angular speed of the rotational component is greater than the threshold value, enable the flow of the liquid metal into the liquid metal interface.

7. The liquid metal bearing assembly of claim 1, where the liquid metal passage extends in an axially direction bridging opposing axially sides of a seal formed between the rotational component and the stationary component.

8. The liquid metal bearing assembly of claim 1, further comprising a fill port with a first end opening into the liquid metal reservoir and a second end include a plug.

9. The liquid metal bearing assembly of claim 1, where the liquid metal reservoir includes a plurality of discrete sections.

10. The liquid metal bearing assembly of claim 1, further comprising a flowback channel including:
    a first end positioned axially inboard from a seal formed between the rotational component and the stationary component; and
    a second end positioned axially outboard from the seal and axially inboard from the first liquid metal reservoir.

11. The liquid metal bearing assembly of claim 1, where the rotational component includes a first section press fit into a second section and where the first section includes a stress relief portion configured to accommodate for material deformation of the first section occurring during press fitting.

12. The liquid metal bearing assembly of claim 1, where the liquid metal interface is in a thrust bearing and adjacent to an outer radial surface of a flange.

13. The liquid metal bearing assembly of claim 1, where the liquid metal interface is included in a journal bearing.

14. A method for supplying a liquid metal to a liquid metal bearing assembly, comprising:
    during a first rotational condition, inhibiting a flow of the liquid metal into a liquid metal interface from a liquid metal reservoir, where a liquid metal passage extends between the liquid metal reservoir and the liquid metal interface; and during a second rotational condition, flowing the liquid metal to the liquid metal interface from the liquid metal reservoir;
where the liquid metal interface is positioned between a rotational component and a stationary component; and
where the liquid metal reservoir is positioned radial inward from the liquid metal interface.

15. The method of claim 14, where the flow of the liquid metal is inhibited by an anti-wetting surface in the liquid metal reservoir.

16. The method of claim 14, where the first rotational condition is a condition where an angular speed of the rotational component is less than a threshold value and the second rotational condition is a condition where the angular speed of the rotational component is greater than the threshold value.

17. The method of claim 14, further comprising venting gas from the liquid metal reservoir through a gas vent passage in fluidic communication with the liquid metal reservoir.

18. A system comprising:
a first liquid metal bearing in a vacuum enclosure, the first liquid metal bearing assembly comprising:
a first liquid metal interface positioned between a stationary component and a rotational component;
where the rotational component comprises:
a first liquid metal reservoir configured to contain a liquid metal and positioned radially inward from the first liquid metal interface;
a first gas vent passage in fluidic communication with the first liquid metal reservoir and configured to vent gas from the first liquid metal reservoir;
a first liquid metal passage extending between the first liquid metal reservoir and the first liquid metal interface; and
a first anti-wetting surface in the first liquid metal passage.

19. The system of claim 18, further comprising:
a second liquid metal bearing in the vacuum enclosure, the second liquid metal bearing assembly comprising:
a second liquid metal interface positioned between the stationary component and the rotational component;
where the rotational component comprises:
a second liquid metal reservoir configured to contain a liquid metal and positioned radially inward from the second liquid metal interface;
a second gas vent passage in fluidic communication with the second liquid metal reservoir and configured to vent gas from the second liquid metal reservoir;
a second liquid metal passage extending between the second liquid metal reservoir and the second liquid metal interface; and
a second anti-wetting surface in the second liquid metal passage.

20. The system of claim 19, where the first liquid metal bearing is a thrust bearing and the second liquid metal bearing is a journal bearing.

* * * * *